United States Patent [19]

Sugimoto et al.

[11] Patent Number: 4,462,222
[45] Date of Patent: Jul. 31, 1984

[54] DILUTE SOLUTION PRODUCING SYSTEM OF ABSORPTION REFRIGERATING APPARATUS

[75] Inventors: Shigeo Sugimoto; Ryohei Minowa; Kozi Sakai, all of Ibaraki, Japan

[73] Assignee: Hitachi, Ltd., Tokyo, Japan

[21] Appl. No.: 448,593

[22] Filed: Dec. 10, 1982

[30] Foreign Application Priority Data

Dec. 11, 1981 [JP]  Japan ................... 56-198404

[51] Int. Cl.³ ............................................. F25B 15/00
[52] U.S. Cl. ........................................ 62/476; 62/494
[58] Field of Search ................................ 62/476, 494

[56] References Cited

U.S. PATENT DOCUMENTS

| | | | |
|---|---|---|---|
| 2,430,047 | 11/1947 | Edberg | 62/494 X |
| 2,494,972 | 1/1950 | Thomas et al. | 62/494 X |
| 3,124,938 | 3/1964 | Leonard, Jr. | 62/494 X |
| 3,126,720 | 3/1964 | Stubblefield | 62/494 X |
| 3,299,667 | 1/1967 | Aronson et al. | 62/476 |
| 4,085,595 | 4/1978 | Saito et al. | 62/476 |

FOREIGN PATENT DOCUMENTS 53-39544 12/1982 Japan .

Primary Examiner—Lloyd L. King
Attorney, Agent, or Firm—Antonelli, Terry & Wands

[57] ABSTRACT

A dilute solution producing system of an absorption refrigerating apparatus wherein spraying of a solution and absorption of a refrigerant gas into the solution take place in a plurality of stages to produce a solution of low concentration. A solution of high concentration is sprayed in a zone of cooling water of high temperature in an absorber and the refrigerant gas is absorbed into the sprayed solution to produce a solution of intermediate concentration, and the solution of intermediate concentration is sprayed in a zone of cooling water of low temperature and the refrigerant gas is absorbed into the sprayed solution to produce a dilute solution as desired.

11 Claims, 3 Drawing Figures

DILUTE SOLUTION PRODUCING SYSTEM OF ABSORPTION REFRIGERATING APPARATUS

BACKGROUND OF THE INVENTION

1. Field of the Invention

This invention relates to an absorption refrigerating apparatus suitable for use in effecting space cooling or air conditioning.

2. Description of the Prior Art

In an absorption refrigerating apparatus, the absorber performs the function of causing a refrigerant in a gaseous state to be absorbed by a concentrated solution to produce a dilute solution. The use of an absorption step divided into a plurality of stages (two stages) for producing an increasingly thinned-down dilute solution is disclosed in Japanese patent application Laid-Open No. 39544/78. In the disclosure, the absorber is partitioned into a section in which a solution is collected and a section which is vacant and a concentrated solution from the generator is sprayed onto one of the sections to absorb a refrigerant gas from the evaporator to produce a solution of intermediate concentration which is sprayed by a pump onto the other section to cause same to further absorb the refrigerant gas to produce a dilute solution.

In the invention disclosed, the problem with regard to the relation between the cooling water for accelerating the absorption and the use of the spray performed in two stages is not solved yet. Also, no satisfactory solution has yet been found as to the most effective application of the invention with regard to putting the use of the absorption step of two stages into practical use.

SUMMARY OF THE INVENTION (1) Objects of the Invention

An object of this invention is to provide an absorption refrigerating apparatus in which the most effective combination of dispersion of a solution with a flow of the cooling water is envisaged in producing a dilute solution.

Another object is to provide an absorption refrigerating apparatus capable of reducing the size of the absorber as compared with absorbers of the prior art.

(2) Statement of the Invention

To accomplish the aforesaid objects, the invention provides the feature that a cooling water is allowed to flow through a nest of cooling water tubes in the absorber in one direction from one longitudinal end of the nest of the cooling water tubes toward the other end thereof and the spray header is divided into a plurality of sections longitudinally of the nest of the cooling water tubes, so that a concentrated solution of higher concentration in the absorption refrigerating apparatus is sprayed from the spray header section which is located nearest the outlet end of the cooling water tubes to produce a solution which is sprayed from the spray header section which is located second nearest the outlet end of the cooling water tubes. The aforesaid operation is repeatedly performed until a dilution to the desired concentration is obtained in a portion of the cooling water nearest the inlet end thereof.

In the invention, the spray header in the absorber is divided into a plurality of sections (preferably two sections) lengthwise of the nest of cooling water tubes, and the invention is characterized by the absence of a partition member located in a solution sump section for avoiding mixing of solution of different concentrations with each other to maintain the difference in concentration between the solutions. According to the invention, mixing of the solutions of different concentrations is avoided as follows. Take the two adjacent spray header sections. A solution is being continuously sprayed from the two spray header sections and successively drips down into the solution sump section below the two spray header sections. Meanwhile the solution is being drawn by suction from the solution sump section to solution pumps corresponding to the two spray header sections, so that in the solution sump section a main current of solution flows from the surface of the solution toward the bottom thereof and a current of solution directed longitudinally of the nest of cooling water tubes is very small in amount. Thus in the solution sump section immediately below the boundary between the two spray header sections, it is possible to draw off solutions of different concentrations by suction by means of solution pumps although mixing of the solutions of different concentrations is unavoidable to a certain extent, if the solution pumps are located in positions not immediately below the boundary between the two adjacent spray header sections.

DETAILED DESCRIPTION OF THE PREFERRED EMBODIMENT

Figure 1:
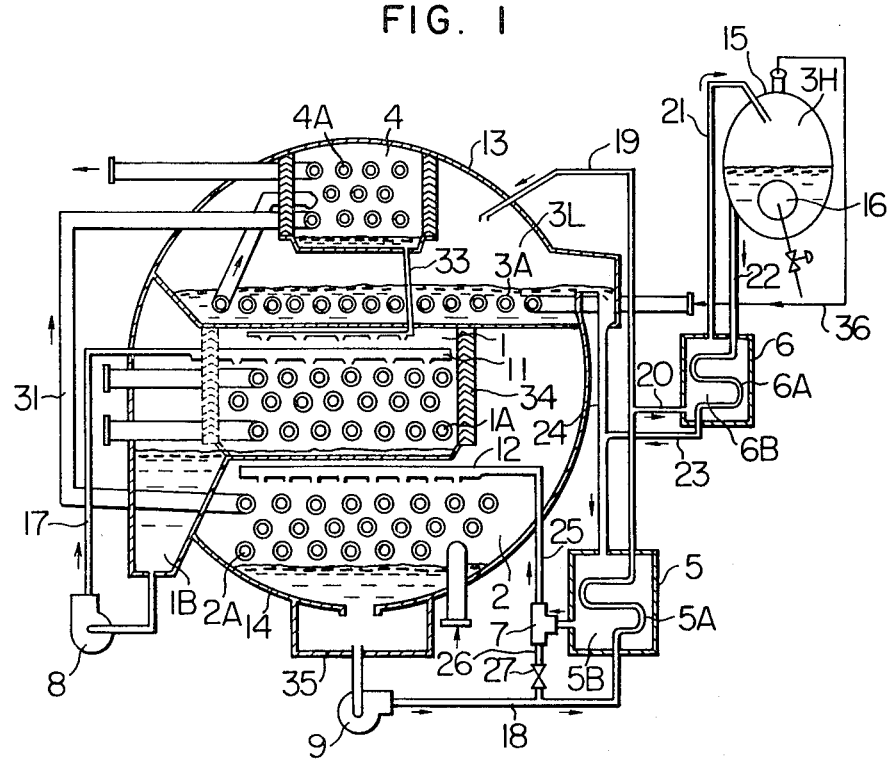
FIG. 1 is a systematic view of the absorption refrigerating apparatus comprising one embodiment of the invention, shown in a cross section taken along a plane perpendicular to the length of the shell.
Figure 2:
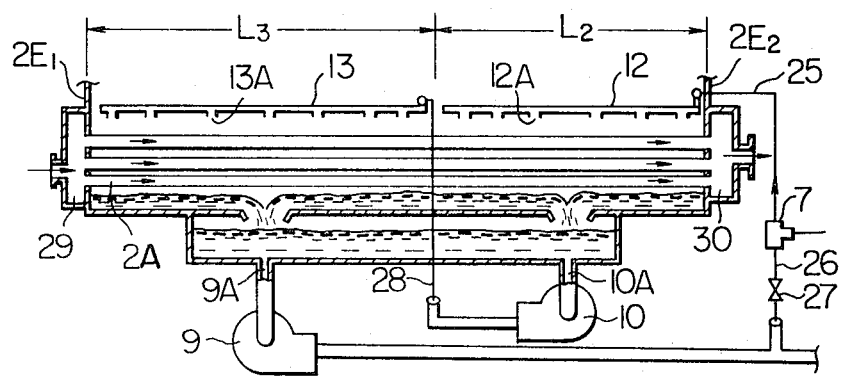
FIG. 2 is a systematic view of the essential portions of the embodiment shown in FIG. 1.

FIGS. 1 and 2 show a preferred embodiment of the invention. The absorption refrigerating apparatus comprises an evaporator 1, an absorber 2, a low temperature generator 3L, a high temperature generator 3H, a condenser 4, a first heat exchanger 5, a second heat exchanger 6, an ejector 7, a refrigerant pump 8, a solution pump 9, a first solution spray pump 10, a refrigerant spray header 11, a first spray header 12 and a second spray header 13.

The evaporator 1, absorber 2, low temperature generator 3L, condenser 4, refrigerant spray header 11, first spray header 12 and second spray header 13 are contained in a shell 14. The refrigerant pump 8, solution pumps 9 and 10, first and second heat exchangers 5 and 6 and ejector 7 are located outside the shell 14. The high temperature generator 3H is located in a separate shell 15 and provided with a heating source 16 comprising a burner.

The evaporator 1 comprises a nest of heat transfer tubes 1A. The absorber 2 comprises a nest of heat transfer tubes 2A. The condenser 4 comprises a nest of cooling water tubes 4A. The low temperature generator 3L comprises a nest of heating tubes 3A.

The refrigerant spray header 11 is arranged above the nest of heat transfer tubes 1A in the evaporator 1 and connected through a line 17 to the discharge side of the refrigerant pump 8.

The solution pump 9 is connected at its discharge side through a line 18 to a heat transfer tube 5A of the first heat exchanger 5 which in turn is connected to a line 19 connected to the low temperature generator 3L. Connected to the line 19 midway between its opposite ends through a line 20 is a shell 6B of the second heat exchanger 6 connected through a line 21 to the high temperature generator 3H. A heat transfer tube 6A of the second heat exchanger 6 is connected through a line 22 to a solution section of the high temperature generator 3H.

The heat transfer tube 6A is connected through a line 23 to a shell 5B side of the first heat exchanger 5, and the shell 5B side is connected to the ejector 7. A solution section of the low temperature generator 3L is connected through a line 24 to the line 23 midway between its opposite ends.

As shown in detail in FIG. 2, the first spray header 12 and second spray header 13 are arranged above the nest of heat transfer tubes 2A in the absorber 2. The first spray header 12 is connected through a line 25 to the ejector 7 which in turn is connected through a line 26 to the line 18 midway between its opposite ends. The line 26 has mounted midway between its opposite ends an on-off valve 27 having the functions of effecting flow rate control and closing the line 26.

The second spray header 13 is connected through a line 28 to the discharge side of the first solution spray pump 10. The solution pump 9 includes a suction pipe 9A connected to the first spray header 12 at its lower portion, and a suction pipe 10A of the first solution spray pump 10 is connected to the first spray header 12 at its lower portion. The first spray header 12 and the second spray header 13 have lengths $L_2$ and $L_3$ respectively which are in the ratio $L_2:L_3=38:62$. The relation between the first spray header 12 and the second spray header 13 as expressed by the ratio of $L_2$ to $L_3$ as measured longitudinally of the heat transfer tubes is as significant as their relation expressed by the ratio of the first spray header to the second spray header with respect to the area contributing to spraying or by the ratio of the number of spray nozzles 12A of the first spray header 12 to the number of spray nozzles 13A of the second spray header 13.

The nest of cooling water tubes 2A of the absorber 2 comprises a multiplicity of heat transfer tubes extending from one end $2E_1$ of the absorber 2 to the other end $2E_2$ thereof. Cooling water headers 29 and 30 are arranged on opposite ends of the heat transfer tubes 2A respectively. The cooling water headers have been shown only with the absorber 2. However, it is to be understood that the evaporator 1, condenser 4 and low temperature generator 3L and each provided with cooling water headers.

Operation of the embodiment shown and described hereinabove will be described.

In the evaporator 1 maintained at a low pressure, a refrigerant in a liquid state absorbs heat from the cold water flowing through the heat transfer tubes 1A and evaporates. At this time, the cold water is cooled and cooling function is performed by the cold water. To increase the evaporation effect, the refrigerant in a liquid state is sprayed onto the heat transfer tubes 1A through the spray header 11 by the refrigerant pump 8. A refrigerant in a gaseous state obtained by the evaporation of the liquid refrigerant in the evaporator 1 is absorbed into an aqueous solution of lithium bromide kept at a constant temperature in the absorber 2 as subsequently to be described.

Meanwhile, cooling water flows from the header 29 through the nest of heat transfer tubes 2A in the absorber 2 to cool the interior of the absorber 2 and is introduced through the header 30 and a line 31 into the condenser 4 wherein it flows through the heat transfer tubes 4A. The solution in the low temperature generator 3L is heated by the refrigerant gas flowing through the heating tubes 3A and separated into a refrigerant gas and a concentrated solution. The separated refrigerant gas is led into the condenser 4 where it is cooled by the cooling water flowing through the heat transfer tubes 4A and condensed into a condensate which flows through a passageway 33 back into the evaporator 1. The refrigerant gas is condensed while flowing through the heating tubes 3A to heat the solution into a liquid refrigerant which flows into the condenser 4.

The concentrated solution obtained by heating and concentrating a solution in the low temperature generator 3L flows through the line 24, first heat exchanger 5, ejector 7 and line 25 into the first spray header 12 to be sprayed through the nozzles 12A onto the nest of heat transfer tubes 2A. At this time, the valve 27 is completely closed but may be opened when necessary to mix a portion of the dilute solution discharged from the solution pump 9 with the concentrated solution referred to hereinabove when the latter is sprayed from the nozzles 12A. Stated differently, a concentrated solution of higher density and temperature is sprayed onto portions of the heat transfer tubes 2A at which the temerature of the cooling water is higher than on the inlet side of the heat transfer tubes 2A.

The solution sprayed onto the heat transfer tubes 2A on the outlet side absorbs the refrigerant gas flowing from the evaporator 1 through an eliminator 34 and changes to a solution of intermediate concentration which is led temporarily into a solution sump 35. The solution of intermediate concentration is drawn by suction into the first solution spray pump 10 through the suction pipe 10A of the first solution spray pump 10 and fed through the line 28 to the second spray header 13 where it is sprayed through the nozzles 13A on to the heat transfer tubes 2A on the cooling water inlet side thereof. Stated differently, the solution of intermediate concentration and temperature is sprayed onto portions of the heat transfer tubes 2A at which the cooling water temperature is lower than on the outlet side thereof. The solution of intermediate concentration sprayed onto the heat transfer tubes 2A on the inlet side thereof absorbs the refrigerant gas flowing from the evaporator 1 through the eliminator 34 and changes to a dilute solution.

The dilute solution is drawn by suction into the solution pump 9 and flows through the line 18, heat transfer tube 5A of heat exchanger 5 and line 19 to the low temperature generator 3L. The dilute solution also flows through the line 20 branching from the line 19, shell 6A side of second heat exchanger 6 and line 21 to the high temperature generator 3H. Stated differently, the dilute solution is fed to the low temperature generator 3L and high temperature generator 3H in currents parallel to each other.

The solution in the high temperature generator 3H is heated by the heating source 16 to generate a refrigerant in the gaseous state which flows through a line 36 to the nest of heating tubes 3A, to heat the solution in the low temperature generator 3L as aforesaid.

Meanwhile a refrigerant in a gaseous state is produced in the high temperature generator 3H and a concentrated solution flows through the line 22, heat transfer tube 6A of second heat exchanger 6 and line 23 to the line 24 where it joins the concentrated solution and flows through the shell 5B side of first heat exchanger 5, ejector 7 and line 25 to the first spray header 12 to be sprayed on to the cooling water tubes 2A.

It will be seen that according to the invention a solution of higher concentration is sprayed, as described hereinabove, from the spray header divided at least into two sections longitudinally of the tubes 2A onto portions of the cooling water tubes 2A in the absorber 2 on the outlet side thereof on which the cooling water temperature is high and a solution of lower concentration is sprayed onto portions of the cooling water tubes 2A on the inlet side thereof on which the cooling water temperature is low, to insure that there is a difference in temperature between the cooling water and the solution. This enables the difference in the temperature between them to be effectively utilized to allow heat exchange to take place satisfactorily. Thus, it is possible to obtain a solution of very low concentration in the absorber 2.

Figure 3:
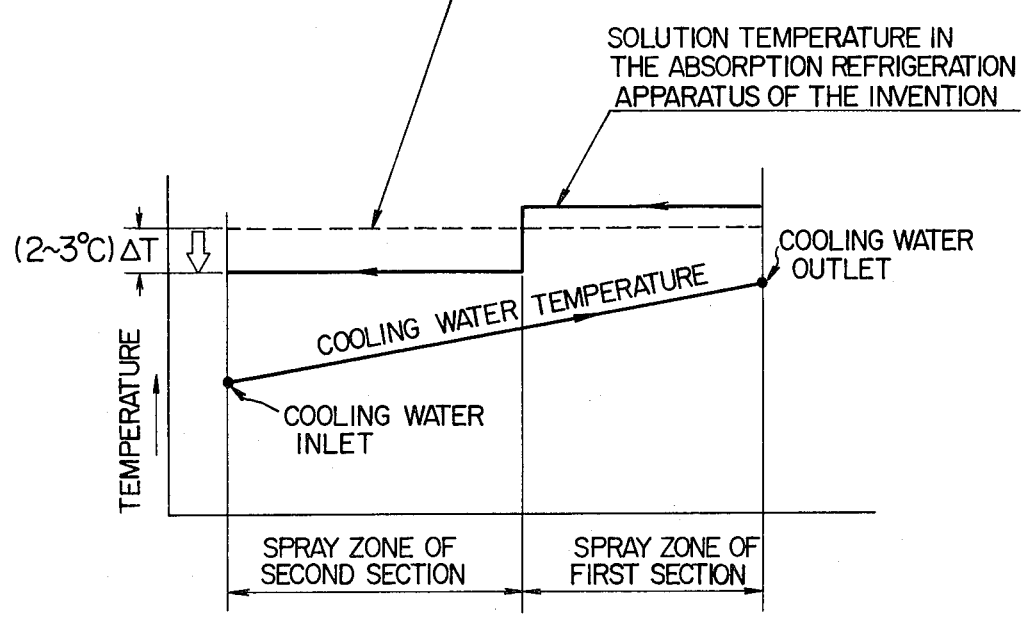
FIG. 3 is a graph showing the embodiment of the invention shown in FIG. 1 in comparison with an absorption refrigerating apparatus of the prior art with regard to the solution temperature and the cooling water temperature.

FIG. 3 shows the embodiment of the absorption refrigerating apparatus in conformity with the invention shown and described hereinabove in comparison with an absorption refrigerating apparatus of the prior art with regard to the solution temperature and cooling water temperature. In the figure, it will be seen that in the embodiment of the invention the temperature of the solution can ultimately be reduced by 2°-3° C. and hence the concentration of the solution can be reduced by 1-1.5% as compared with the corresponding values in the absorption refrigerating apparatus of the prior art.

By increasing the amount of a solution of intermediate concentration sprayed from the second spray header 13 over the amount of a solution of high concentration sprayed from the first spray header 12, it is possible to prevent mixing of the solution of higher concentration with the solution of lower concentration because the solution of higher concentration flows to the higher concentration solution side. In addition, it is possible essentially to partition the interior of the absorber 2 into sections for containing the solution without using partition walls.

Although in the embodiment shown and described hereinabove the spray header in the absorber is divided into two spray header sections, it is to be understood that the invention is not limited to this specific number of spray header sections and that the spray header may be divided into more than three spray header sections.

Additionally the invention can have application in achieving not only single utility but also double utility.

What is claimed is:

1. In an absorption refrigerating apparatus comprising:
   at least one generator having a heating source for heating a solution to generate a refrigerant in a gaseous state;
   a condenser for condensing said refrigerant in the gaseous state by cooling into a refrigerant in a liquid state;
   an evaporator causing the refrigerant in the liquid state to evaporate for performing cooling by utilizing the latent heat of evaporation;
   an absorber having a refrigerant in a gaseous state produced in said evaporator and a concentrated solution produced in said generator introduced therein to cause the refrigerant in the gaseous state to be absorbed into the concentrated solution to produce a dilute solution;
   a solution pump for feeding said dilute solution into said generator; and
   a heat exchanger for causing a heat exchange to take place between the solution flowing into said generator and the solution flowing out of the generator;
   wherein said absorber has a nest of cooling water tubes comprising a plurality of heat transfer tubes extending from one end of a shell to the other end thereof to allow cooling water to flow into said heat transfer tube through one end thereof and flow out of it through the other end thereof;
   a dilute solution producing system comprising:
   spray header means located above said nest of heat transfer tubes in said absorber and divided into a plurality of spray header sections extending in a longitudinal direction of the heat tranfer tubes, a first spray header section located nearest an outlet end of the cooling water being connected to a path of flow of the solution flowing out of said generator so as to spray the solution flowing out of the generator, the solution sprayed by said first spray header section absorbing a refrigerant in a gaseous state so as to produce a solution of intermediate concentration; and
   at least one solution spray pump for drawing by suction said solution intermediate concentration and feeding same into the next following spray header section, a solution sprayed by the spray header section located nearest an inlet end of the cooling water in the absorber absorbing a refrigerant in a gaseous state to produce a dilute solution.

2. A dilute solution producing system as claimed in claim 1, wherein said spray header means located above said nest of heat transfer tubes in the absorber is divided into a first spray header section located on the outlet end of the cooling water, and a second spray header section located on the inlet end thereof.

3. A dilute solution producing system as claimed in claim 2, wherein the area of said first spray header section contributing to spraying is smaller than that of said second spray header section.

4. A dilute solution producing system as claimed in claim 2, wherein said solution pump is connected to said second spray header section in such a manner that the refrigerant in the gaseous state is absorbed into the solution sprayed from the first spray header section to provide a solution of intermediate concentration, said solution of intermediate concentration being drawn by suction by the solution pump and sprayed from the second spray header section.

5. A dilute solution producing system as claimed in claim 3, wherein the ratio of the area of the first spray header section contributing to spraying to the area of the second spray header section contributing to spraying is about 38:62.

6. A dilute solution producing system as claimed in claim 1, wherein said refrigerating apparatus comprises a low temperature generator and a high temperature generator to effect heating of said low temperature generator by a refrigerant of a gaseous state produced by said high temperature generator, and wherein said absorber, solution pump, heat exchanger, low temperature generator and high temperature generator are connected together in such a manner that dilute solution produced by said absorber is fed by said solution pump through said heat exchanger into said low temperature and high temperature generators in parallel to each other.

7. A dilute solution producing system as claimed in claim 6, wherein said spray header means located above said nest of heat transfer tubes in the absorber is divided into a first spray header section located on the outlet end of the cooling water, and a second spray header section located on the inlet end thereof.

8. A dilute solution producing system as claimed in claim 7, wherein the area of said first spray header section contributing to spraying is smaller than that of said second spray header section.

9. A dilute solution producing system as claimed in claim 7, wherein said solution pump is connected to said second spray header section in such a manner that the refrigerant in the gaseous state is absorbed into the solution sprayed from the first spray header section to provide a solution of intermediate concentration, said solution of intermediate concentration being drawn by suction by the solution pump and sprayed from the second spray header section.

10. A dilute solution producing system as claimed in claim 8, wherein the ratio of the area of the first spray header section contributing to spraying to the area of the second spray header section contributing to spraying is about 38:62.

11. A dilute solution producing system as claimed in claim 8, further comprising an ejector interposed between the first spray header section and the heat exchanger, a line connected to said ejector at one end and to a discharge side of the solution pump at the other end to introduce a portion of the solution from the solution pump, and a valve mounted in said line midway between the opposite ends.

* * * * *